A. A. KENT.
PRISMATIC TELESCOPE.
APPLICATION FILED FEB. 1, 1919.
1,364,381.
Patented Jan. 4, 1921.
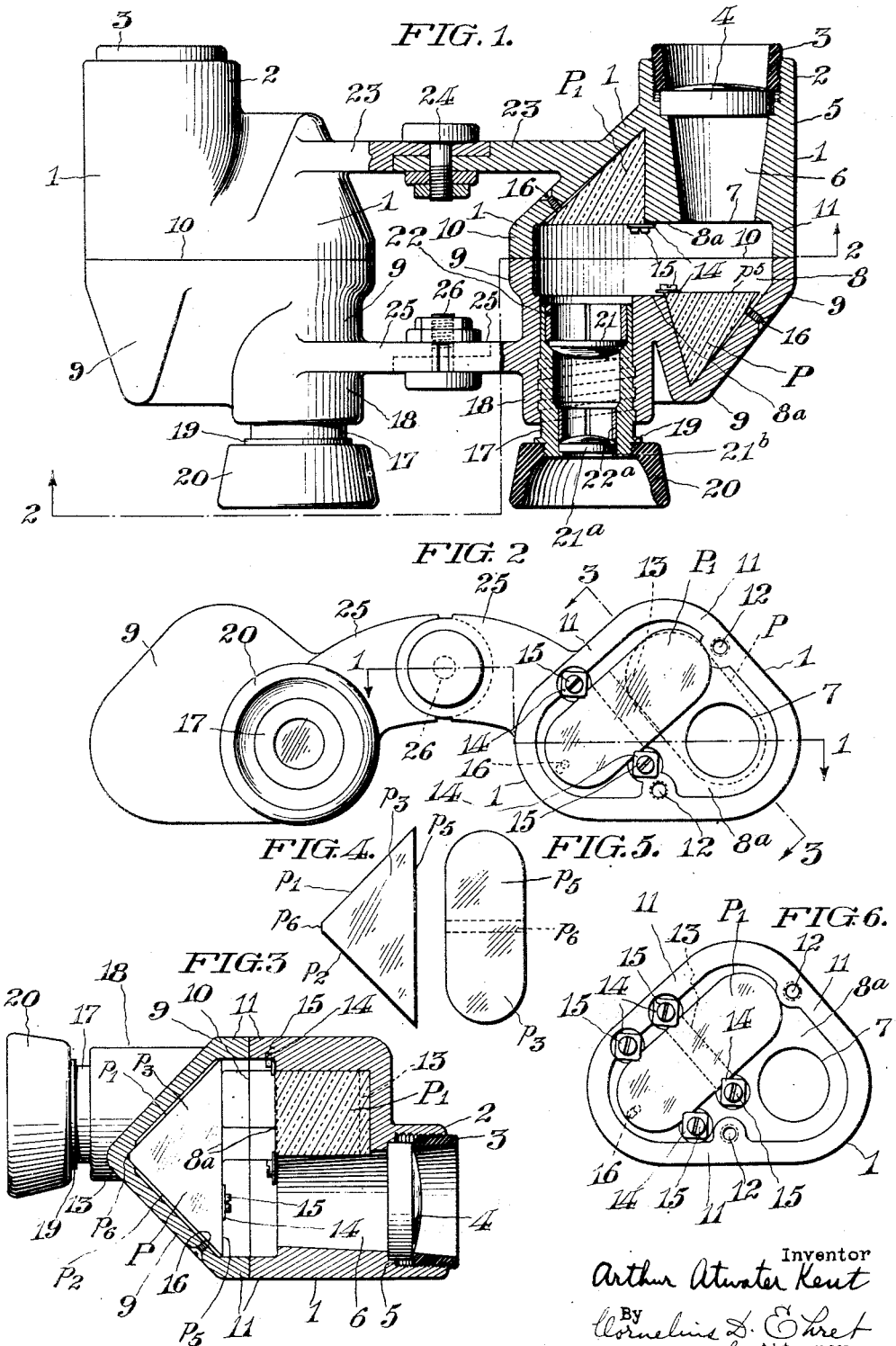
Inventor
Arthur Atwater Kent
By Cornelius D. Ehret
his Attorney.

UNITED STATES PATENT OFFICE.

ARTHUR ATWATER KENT, OF ARDMORE, PENNSYLVANIA.

PRISMATIC TELESCOPE.

1,364,381.  Specification of Letters Patent.  Patented Jan. 4, 1921.

Application filed February 1, 1919. Serial No. 274,394.

*To all whom it may concern:*

Be it known that I, ARTHUR ATWATER KENT, a citizen of the United States, residing in Ardmore, county of Montgomery, and State of Pennsylvania, have invented certain new and useful Improvements in Prismatic Telescopes, of which the following is a specification.

My invention relates to prismatic telescopes in which prisms are disposed in such coöperative relation between the objective lens and the ocular or eye piece lens or lens combination that a long circuitous path for the light rays is provided whereby an objective of suitably long focus may be employed notwithstanding the relatively short distance between the objective and ocular systems as measured in the direction in which the objective is pointed.

My invention resides in a prism mounting, particularly suitable for use in telescopes of the character above referred to, and utilizable for adjusting or positioning the prism, particularly as to angular position about the intersection of its reflecting faces. By recourse to a mounting embodying my invention there may be employed a prism one or more of whose faces may be determined or positioned with respect to each other or with respect to other faces of the prism with a degree of accuracy or precision which is less than has heretofore in the art been deemed necessary. My invention therefore makes possible the use of prisms which are more cheaply produced than prisms of great and costly accuracy.

My invention resides in further features of structure as a result of which simplicity and reduction in number of parts are attained, with resultant reduction in cost.

For an illustration of some of the various forms my invention may take, reference is to be had to the accompanying drawing, in which:

Figure 1 is a plan view, partly in section on the line 1—1 of Fig. 2, of a binocular prismatic telescope embodying my invention.

Fig. 2 is an end view of the structure shown in Fig. 1, partly in section on the line 2—2 of Fig. 1.

Fig. 3 is a sectional view, partly in elevation, taken on the line 3—3 of Fig. 2.

Fig. 4 is a side view of a prism.

Fig. 5 is a fac view of the same.

Fig. 6 is a fragmentary end view of structure embodying modified means for holding a prism.

Referring to the drawing, 1 is a casing, of metal or other suitable material, having a cylindrical extension or barrel 2 interiorly threaded to receive the threaded ferrule, 3 of any suitable mateial, as molded Bakelite, which holds the objective lens or combination 4 against the shoulder 5. Within the body 1 below the lens 4 is the conical or other suitably shaped light passage or lens barrel 6 terminating at 7, where it communicates with the chamber 8 formed between the casing 1 and the complementary casing 9. These casings have a common joint at 10 between their marginal flanges 11 held together in any suitable manner, as by pins or dowels 12 on one member engaging in complementary holes in the opposing member.

In the casing 9 opposite the objective 4 is the prism P of the usual triangular form. Such a prism is shown in side view in Fig. 4. It has the faces $p^1$ and $p^2$, both normal to the plane of the paper, which are ground and polished true in planes between which there is an accurately determined angle of 90 degrees. The side faces $p^3$ and $p^4$ are rough ground and are substantially parallel to each other. The fifth face or base $p^5$ is a ground and polished plane which in the prior art, I believe, has always been disposed with great accuracy at 45 degrees with respect to the faces $p^1$ and $p^2$, and precisely normal to two parallel side faces as $p^3$ and $p^4$. In virtue of my prism mounting, presently to be described, great accuracy as to position of the faces $p^3$ and $p^4$ with respect to each other or to faces $p^1$, $p^2$, and great accuracy in determining the face or base $p^5$ with respect to the faces $p^3$, $p^4$ and $p^1$, $p^2$ are not essential, these three faces $p^3$, $p^4$ and $p^5$ being brought to substantially the relations specified, without, however, effecting the great precision heretofore observed. And particularly the face or base $p^5$ through which the light rays enter and leave may vary from the aforementioned precision within reasonable limits. Because of the lack of need of the precision heretofore practised as regard three of the five faces, the cost of production of each prism is obviously materially reduced. By way of example merely, and without limitation of my invention thereby, it may be stated that the lateral faces $p^3$ and $p^4$ may vary quite widely from true parallelism, a variation of several degrees or more being allowable. With respect to the angle between the face or base $p^5$ and the reflecting faces $p^1$ and $p^2$ a variation of the order of one degree is permissible. Thus, if in lieu of an angle between face $p^1$ and base $p^5$ of 45 degrees, which is the ideal, that angle may in my structure be approximately $44\frac{1}{2}$ degrees or $45\frac{1}{2}$ degrees. It accordingly will be understood that with these permissible variations costly accuracy as to positioning or grinding of three of the five prism faces is dispensed with without sacrifice of satisfactory and practical optical effects.

As best seen in Fig. 3, the casing member 9 has therein a recess or cavity of substantially the size and shape of the prism P whose edge at or near the intersection of faces $p^1$, $p^2$ rests in a V-shaped seat 13 of equal or slightly larger angle machined or accurately die-cast in the casing 9. While the faces $p^1$, $p^2$ may actually intersect in a sharp edge, that edge may be more or less reduced to a narrow face, as indicated at $p^c$. The seat 13 extends entirely across the prism P, or extends only a short distance in from each of the faces $p^3$ and $p^4$, as may be desired. In the vicinity of the faces $p^1$ and $p^2$ the inner faces of the casing 9 are spaced from the prism, and may be blackened or otherwise rendered non-reflecting.

As shown in Fig. 2 in connection with the second prism $p^1$, each prism is engaged on its face $p^5$ at a region to one side of the seat 13 by resilient holding clips 14 which may be of thin spring steel or equivalent material more or less bowed or dished, held by screws 15 threaded into the casing member 1. The relation illustrated is such that the face $p^5$ is substantially flush with the face or wall $8^a$ of chamber 8. To the same side of the seat 13 on which the holding clips 14 are disposed there is carried by the casing within the prism pocket a lug or abutment 16 which engages the face $p^2$ of the prism. This abutment or lug preferably has very small area of contact with the prism face $p^2$ and may in effect be a point. The surface of the abutment 16 engaging the prism is preferably a reflecting surface, so that there shall be at the contact between lug 16 and the reflecting prism face $p^2$ practically no absorption of light. The abutment 16 may be in effect the end of a screw threaded through the wall of the casing. By screwing the abutment inwardly the prism P, Fig. 3, is slightly rocked upon its pivotal seat 13 in opposition to the spring clips 14 between which and the abutment 16 the prism is firmly held in suitable optical relation with the remainder of the optical system.

To one side of the lens barrel 6 in casing 1 is disposed the second prism $P^1$ suitably positioned with respect to the prism P and with respect to the occular or eye piece system carried by the casing 9. The eye piece structure comprises the barrel 17 threaded into the cylindrical extension or chamber 18 integral with the casing 9. At its outer end there is threaded to the barrel 17 against the shoulder 19 thereon the eye hood 20 of any suitable material, as for example, molded Bakelite. At its forward end the barrel 17 is recessed for introduction from its front end of the eye piece lens or occular 21 resting against a suitable shoulder within the barrel 17 and held in place by the slotted ferrule or tube 22 expanded within the outer end of the barrel 17 and frictionally engaging at its periphery the inner face of the barrel 17, the inner edge of the ring 22 holding the lens 21 against its seat. At the rear end of the eye piece structure is a second lens $21^a$ introduced from the front end of the barrel 17 and resting against the shoulder $21^b$ and held thereagainst by a slotted ferrule or tube $22^a$ similar to the aforementioned ferrule or tube 22.

Rotation of the barrel 17 moves the lens 21 toward or away from the prism $P^1$ and so in effect toward or away from the objective 4, for focusing purposes as well understood in the art.

In Fig. 2 the position of the prism P is indicated by dotted lines. One end of its face $p^5$ is opposite the objective 4, while the other end of the same face is disposed opposite one end of the face $p^5$ of the prism $P^1$, the two prisms being disposed in substantially right angle position with respect to each other in well known manner. The other end of the face $p^5$ of prism $P^1$ is disposed opposite the occular 21.

The two telescope units shown in Figs. 1 and 2 may be joined together in any well known manner to constitute a binocular prismatic telescope. As indicated, the casings 1 have laterally projecting lugs 23 which are joined by pivot screw 24. Similarly the casings 9 may have the laterally extending lugs 25 pivoted to each other co-axially with pivot 24 by a pivot screw 26.

While I have hereinbefore described one mode of holding a prism upon its pivotal seat 13, various other equivalent modes are comprehended within my invention. For example, as illustrated in Fig. 6, a pair of spring clips 14 may be disposed opposite each other directly above the pivotal seat 13; and to one side thereof, toward the abutment 16, which may again be adjustable, is a further pair of similar or equivalent spring clips 14, all of which yield upon adjustment of abutment 16.

By the type of support or mounting for each prism hereinbefore described it is possible to effect adjustment by rocking or pivotal motion upon its seat 13 nicely to adjust its reflecting surfaces $p^1$ and $p^2$ to proper angular position with respect to the other prism and the associated lens, respectively. Because of this capacity for adjustment in this relation the plane of the entry and exit face $p^5$ need not with great precision, as heretofore practised, be determined with respect to the faces $p^1$ and $p^2$ or as to its angle with the lateral non-reflecting faces $p^3$, $p^4$. While it is theoretically desirable that the base $p^5$ shall be exactly normal to the optical axis of the associated lens and at the same time in precise relation with respect to the surfaces $p^1$ and $p^2$, and as well in precise relation with respect to the side faces $p^3$ and $p^4$, in practice, as I have found, this precision respecting face $p^5$ is not necessary, when means are provided, as those described, or their equivalent, for adjusting each prism with respect to its companion prism and with respect to its associated lens or lens system. Accordingly, when such precision is not required the cost of the herein described prism is substantially less.

Where in the prior practice, as I believe, it has been deemed necessary to determine the five prism faces with precision, in accordance with my invention it is essential to bring only two faces, the reflecting faces $p^1$ and $p^2$, as nearly as possible to the theoretically correct relation with respect to each other.

While I have pointed out that the prism employed in my structure need not attain the optical perfection heretofore deemed necessary, it is to be understood that with my prism mounting there may be employed of course the more perfect and more costly prisms of the prior art.

What I claim is:

1. The combination with a prism, of a mounting therefor comprising a member having a seat engaging an edge of said prism and about which said prism may partake of angular movement in a plane perpendicular to said edge, and adjustable means engaging different faces of said prism holding the same in predetermined angular position on said seat.

2. The combination with a prism, of a mounting therefor having a seat engaging an edge of said prism about which said prism may partake of angular movement on said seat, an adjustable abutment engaging a face of said prism, and resilient means engaging another face of said prism and holding the same against said abutment and said seat.

3. The combination with a prism, of a mounting therefor comprising a member having a seat supporting said prism at or near the intersection of two reflecting faces and permitting angular movement of said prism about the intersection of said faces, an adjustable abutment engaging one of said faces, and resilient means engaging another face of said prism and opposing said angular movement thereof.

4. The combination with a prism, of a mounting therefor comprising a member having a seat supporting said prism at or near the intersection of reflecting faces thereof and allowing angular movement of said prism about said intersection, an adjustable abutment engaging one of said faces, and resilient means engaging another face of said prism at substantially equal angles with said first named faces and opposing said angular movement.

5. The combination with a prism, of a member forming a pocket in which said prism is housed, a seat in said pocket supporting said prism at or near the intersection of faces thereof and permitting angular movement of said prism about said intersection, an adjustable abutment in said pocket engaging one of said faces, and resilient means engaging another face of said prism and opposing said angular movement upon adjustment of said abutment.

6. The combination with a prism, of a member forming a pocket in which said prism is housed, a seat in said pocket supporting said prism at or near the intersection of faces thereof and permitting angular movement of said prism about said intersection, an adjustable abutment extending through a wall of said pocket and engaging one of said faces, and resilient clips extending inwardly from opposite edges of a third face of said prism and engaging said face.

7. The combination with a prism having reflecting faces at an angle with each other and a third face through which light rays enter and leave, the plane of said third face being positioned only approximately correctly with respect to said reflecting faces, a mounting for said prism having a seat supporting said prism at or near the intersection of said reflecting faces, an adjustable abutment engaging one of said reflecting faces for adjusting said prism about said intersection, and resilient means engaging said third face holding said prism against said abutment and said seat.

8. A prismatic telescope comprising a plurality of casings or housings joined to each other, a lens and a prism in each casing, the optical axes of the lenses offset with respect to each other, said prisms coöperating with each other and each coöperating with a lens, each of said casings having a pocket in which a prism is housed, and a mounting for each prism comprising a seat in said pocket supporting the prism at or near the intersection of reflecting faces, and an abutment engaging one of said reflecting faces to determine the angular position of the prism about said intersection and with respect to the optical system.

9. A prismatic telescope comprising a plurality of casings or housings joined to each other, a lens and a prism in each casing, the optical axes of the lenses offset with respect to each other, said prisms coöperating with each other and each coöperating with a lens, each of said casings having a pocket in which a prism is housed, a mounting for each prism comprising a seat in said pocket supporting the prism at or near the intersection of reflecting faces, an abutment engaging one of said reflecting faces to determine the angular position of the prism about said intersection and with respect to the optical system, and means engaging a third face and holding the prism against said abutment and said seat.

10. A prismatic telescope comprising lenses and prisms coöperating therewith and disposed optically between them, each prism comprising reflecting faces accurately positioned with respect to each other, a third face through which light rays enter and leave disposed with lesser accuracy with respect to said faces, a mounting for said prism comprising a member having a seat supporting said prism at or near the intersection of said reflecting faces, and a member engaging one of said reflecting faces to determine the angular position of said prism on said seat and with respect to the optical system.

11. A prismatic telescope comprising lenses and prisms coöperating therewith and disposed optically between them, each prism comprising reflecting faces accurately positioned with respect to each other, a third face through which light rays enter and leave, and lateral faces, said third face and lateral faces being determined or positioned with lesser degree of accuracy, a mounting for said prism comprising a member having a seat supporting said prism at or near the intersection of said reflecting faces, and members engaging, respectively, one of said reflecting faces and said third face and determining the angular position of the prism on its seat and with respect to the optical system.

12. In combination with a prism having intersecting reflecting faces and a third face through which light may pass to the reflecting faces, a housing for said prism comprising walls intersecting at an angle slightly greater than that of the reflecting faces of the prism, and means in the housing for adjusting the angular position of the prism within the housing to compensate for a slight imperfection in the angular relation of said third face to the reflecting faces.

13. In a prismatic telescope, a casing for supporting the lenses and prisms of the telescope, a pair of walls forming a part of said casing intersecting at an acute angle to each other and adapted to receive a prism, and means for adjusting the angular position of the prism with respect to said walls.

14. In a prismatic telescope, a casing having offset parallel portions adapted to receive the objective and ocular lenses, angular pockets in the casing adapted to support prisms in the optical axes of said lenses, and a prism within each of said pockets resting upon an edge formed by the intersection of two faces of the prism and movable about said edge as a pivot.

15. In a prismatic telescope, a casing comprising two detachable sections, each section comprising a lens barrel and an offset prism pocket, said sections adapted to be joined in such relation that the prism pocket of each section is disposed opposite the lens barrel of the other sections, prisms within the prism pockets, and means associated with the pockets for adjusting each prism about one of its edges as an axis.

16. In a prismatic telescope, a casing having offset parallel portions adapted to receive the objective and ocular lenses, a pocket in the longitudinal axis of each of said portions, a prism in each pocket, said pockets comprising walls intersecting at an angle slightly greater than that of the reflecting faces of the prism.

In testimony whereof I have hereunto affixed my signature this 27 day of January, 1919.

ARTHUR ATWATER KENT.